July 29, 1952
K. L. BURGENER
2,605,363
PRIVATE BRANCH EXCHANGE CORD CIRCUIT PROVIDING WARNING TONE WHEN OPERATOR LISTENS IN
Filed July 1, 1948
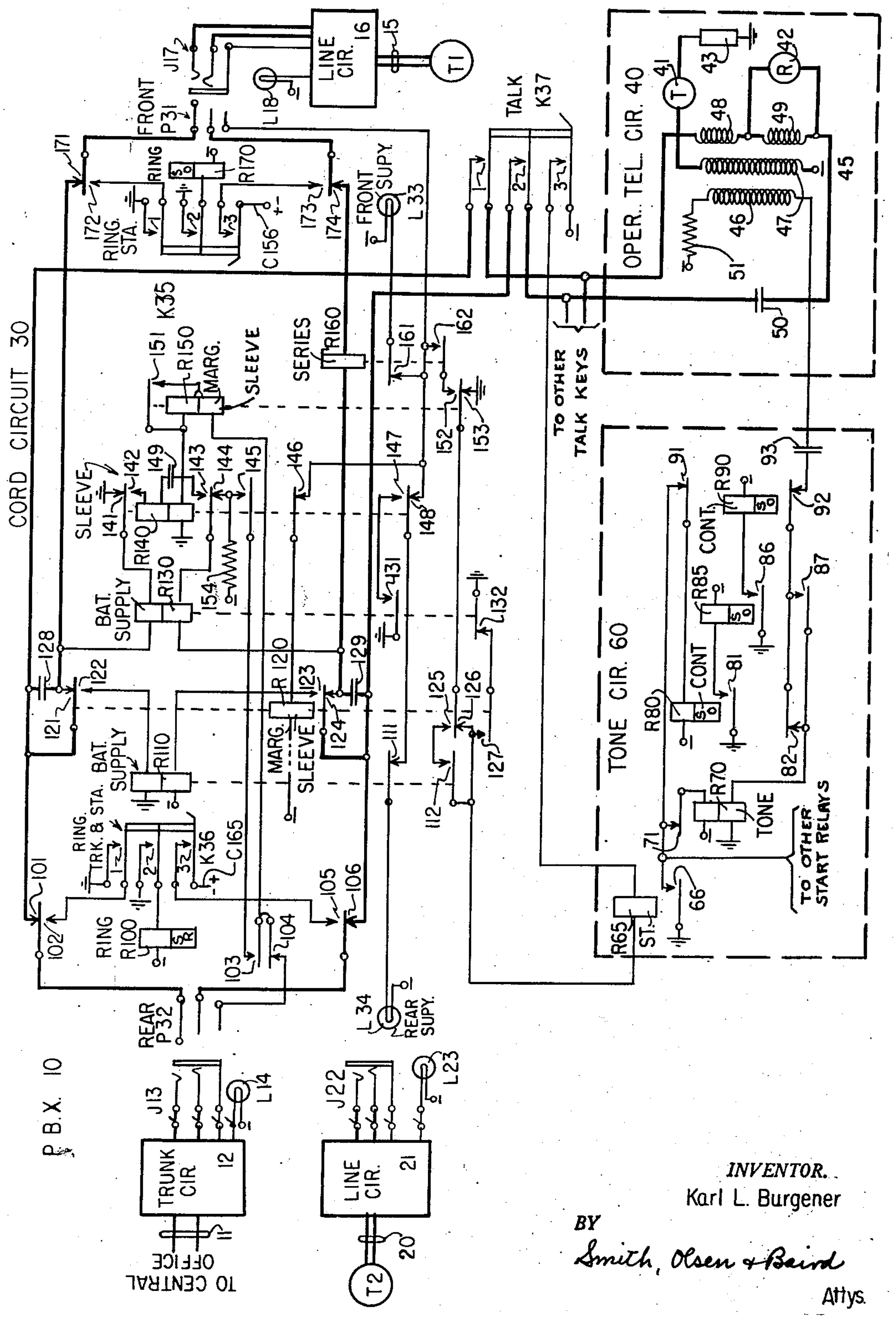
P.B.X. 10
INVENTOR.
Karl L. Burgener
BY
Smith, Olsen & Baird
Attys.

Patented July 29, 1952

2,605,363

UNITED STATES PATENT OFFICE 2,605,363

PRIVATE BRANCH EXCHANGE CORD CIRCUIT PROVIDING WARNING TONE WHEN OPERATOR LISTENS IN

Karl L. Burgener, Villa Park, Ill., assignor to Automatic Electric Laboratories, Inc., Chicago, Ill., a corporation of Delaware Application July 1, 1948, Serial No. 36,535

5 Claims. (Cl. 179—51)

The present invention relates to private branch exchange telephone systems and more particularly to improved switchboard apparatus for such systems.

It is a general object of the present invention to provide in a private branch exchange or P. B. X telephone systems improved switchboard apparatus that is so connected and arranged that whenever the operator telephone circuit at the switchboard is connected into an established local or trunk connection, or whenever a local or trunk connection is established including the operator telephone circuit, a distinct intrusion tone is applied to the established connection in order to warm the persons involved therein of the connection of the operator telephone circuit in the established connection.

Another object of the invention is to provide a manual switchboard including a plurality of cord circuits, wherein the facility noted is incorporated in each of the cord circuits so that whenever the operator at the switchboard connects any idle one of the cord circuits into an established connection that is completed via any other of the cord circuits, an intrusion tone is automatically applied via the one cord circuit to the established connection in the event the operator telephone circuit is connected to the one cord circuit.

A further object of the invention is to provide an improved and exceedingly simple cord circuit embodying the facility noted.

Further features of the invention pertain to the particular arrangement of the circuit elements of the system, whereby the above-outlined and additional operating features thereof are attained.

The invention, both as to its organization and method of operation, together with further objects and advantages thereof, will best be understood by reference to the following specification taken in connection with the accompanying drawing, in which the single figure illustrates the details of an automatic telephone system having incorporated therein the features of the present invention.

Referring now more particularly to the drawing, there is illustrated an automatic telephone system comprising a central office, not shown, and a private branch exchange or P. B. X 10 interconnected by a plurality of trunks, including the trunk 11. The trunks 11, etc. terminate in trunk circuits, not shown, in the central office and in trunk circuits 12, etc., in the P. B. X 10. The central office may be of any suitable type, either manual or automatic; while the P. B. X 10 is of the manual type comprising a manual operator switchboard and a plurality of lines, including the lines 15 and 20 respectively extending to the telephone stations T1 and T2. The lines 15, 20, etc., terminate in line circuits 16, 21, etc., individual thereto.

The trunk circuits 12, etc., are terminated in individual jacks J13, etc., at the switchboard; and the line circuits 16, 21, etc., are terminated in individual jacks J17, J22, etc., at the switchboard. Also the trunk circuits 12, etc., are provided with individual trunk lamps L14, etc., at the switchboard; and the line circuits 16, 21, etc., are provided with individual line lamps L18, L23, etc., at the switchboard. The switchboard may comprise a plurality of operator positions before which multiples of the trunk jacks J13, etc., the trunk lamps L14, etc., the line jacks J17, J22, etc., and the line lamps L18, L23, etc., appear, so that the operator at any position at the switchboard may set up the various connections involving the lines in the P. B. X 10 and the trunks extending between the P. B. X 10 and the central office.

Each operator position at the switchboard in the P. B. X 10 may be provided with equipment identical to that illustrated that includes an operator telephone circuit 40, a tone circuit 60 and a plurality of cord circuits 30, etc. The operator telephone circuit 40 comprises a telephone instrument including a transmitter 41, a receiver 42, and a repeating coil 45, including primary winding section 48 and 49, a secondary winding 47 and a tertiary winding 46. The tone circuit 60 comprises a relay network including a plurality of start relays R65, etc. individual to the cord circuits 30, etc., a tone relay R70, and three control relays R80, R85 and R90.

Preferably, each of the cord circuits is identical to the cord circuit 30 that comprises a front plug P31, a rear plug P32, a front supervisory lamp L33 associated with the front plug P31 and a rear supervisory lamp L34 associated with the rear plug P32. Also the cord circuit 30 comprises a ring station key K35, a ring trunk and station key K36 and a talk key K37. Further the cord circuit 30 comprises a telephone channel between the front plug P31 and the rear plug P32 and a relay network including a ring relay R100, a battery supply relay R110, a sleeve relay R120, a battery supply relay R130, a sleeve relay D140, a sleeve or control relay R150, a series relay R160 and a ring relay R170.

In passing it is noted that when the operator at the switchboard utilizes the cord circuit 30 to set up a telephone connection, the front plug P31 is always employed to answer a call on a line in the P. B. X 10 and that the rear plug P32 is always employed to extend the call to a line in the P. B. X 10 or to a trunk extending between the P. B. X 10 and the central office. Also when the operator at the switchboard utilizes the cord circuit 30 to set up a telephone connection, the rear plug P32 is always employed to answer a call on a trunk extending between the central office and the P. B. X 10; and that the front plug P31 is always employed to extend the call to a line in the P. B. X 10. This coordinated use of the front plug P31 and the rear plug P32 in the cord circuit 30 is necessary since the cord circuit 30 constitutes a universal cord that may be employed for answering calls on both lines in the P. B. X 10 and on trunks extending between the central office and the P. B. X 10.

A better understanding of the connection and arrangement of the apparatus incorporated in the cord circuit 30 in conjunction with the associated equipment at the switchboard will be facilitated from a consideration of the extension of the various local and trunk calls involving the P. B. X 10 and the central office.

First assuming that a call is extended from the central office via the trunk 11 to the P. B. X 10, the trunk circuit 12 is governed to illuminate the trunk lamp L14 in order to indicate the presence of the trunk call waiting to be answered. Now assuming that the operator at the position illustrated at the switchboard in the P. B. X 10 is idle and is to answer the call, an idle cord circuit, such for example, as the cord circuit 30 is selected and the rear plug P32 thereof is inserted into the trunk jack J13 extending to the trunk circuit 12, and the talk key K37 is operated. When the talk key K37 is thus operated, there is completed, at the first and second contacts thereof, a connection including the condenser 50 for bridging the primary winding sections 48 and 49 of the repeating coil 45 across the telephone channel in the cord circuit 30, the transmitter 41 of the telephone instrument at the operator position illustrated is supplied with current via the inductance element 43 and the secondary winding 47 of the repeating coil 45. Also when the talk key K37 is thus operated, there is prepared, at the third contacts thereof, a circuit traced hereinafter for operating the start relay R65 in the tone circuit 60, which arrangement is utilized for a purpose more fully explained subsequently.

When the rear plug P32 is inserted into the trunk jack J13, a circuit, including the sleeve of the trunk jack J13, the sleeve of the rear plug P32 and the contacts 104, is completed for energizing the upper and lower windings of the control relay R150 in series with the lower winding of the sleeve relay R140; whereby the control relay R150 operates to complete, at the contacts 151, a path for short-circuiting the upper winding thereof. At this time, the control relay R150 is retained in its operated position and the sleeve relay R140 operates. Also the trunk circuit 12 is governed in order to extinguish the trunk lamp L14 indicating that the call on the trunk 11 has been answered at this time. Upon operating the sleeve relay R140 completes, at the contacts 142 and 143, a path, including the condenser 149, for connecting the upper winding of the sleeve relay R140 in series via the upper and lower windings of the battery supply relay R130 across the telephone channel in the cord circuit 30. Specifically, the upper and lower windings of the battery supply relay R130 are connected via the contacts 121, 124 and the contacts 101, 106 to the tip and the ring of the rear plug P32 and consequently to the tip and the ring of the trunk jack J13 and thus to the line conductors of the trunk 11. Also the upper and lower windings of the battery supply relay R130 are connected via the contacts 121, 124 and the first and second contacts of the talk key K37 and the condenser 50 to the primary winding sections 48 and 49 of the repeating coil 45; whereby a telephone connection is completed at this time between the trunk 11 and the operator telephone circuit 40 so that the operator at the position illustrated at the switchboard in the P. B. X 10 may converse with the subscriber or operator at the central office and learn the required extension of the call.

Now assuming that the present call is to be extended to the telephone station T1 in the P. B. X 10, the operator at the switchboard in the P. B. X 10 inserts the front plug P31 into the line jack J17, assuming that the telephone station T1 is idle at this time, as indicated by the extinguished line lamp L18. When the front plug P31 is thus inserted into the line jack J17, ground potential in the line circuit 16 is applied via the sleeve of the line jack J17 to the sleeve of the front plug P31, thereby completing a circuit, including the contacts 161, for illuminating the front supervisory lamp L33 in order to indicate that the present call has not been answered at this time.

The operator then operates the ring station key K35 completing, at the second contacts thereof, a circuit for energizing the winding of the ring relay R170 in order to cause the latter relay to operate shortly thereafter, it being of the slow-to-operate type. Upon operating the ring relay R170 interrupts, at the contacts 171 and 174, the connection between the tip and the ring of the front plug P31 and the telephone channel in the cord circuit 30; and completes, at the contacts 172 and 173, a path, including the first and third contacts of the ring front key K35, for connecting ground potential and the ring conductor C156 respectively to the tip and the ring of the front plug P31 and consequently to the tip and the ring of the line jack J17; whereby ringing current is projected over the line 15 to the telephone station T1 operating the ringer thereat. The operator then restores the ring station key K35 in order to effect the restoration of the ring relay R170. Upon restoring the ring relay R170 interrupts, at the contacts 172 and 173, the path for projecting ringing current over the line 15; and recompletes, at the contacts 171 and 174, the connection between the tip and the ring of the front plug P31 and the telephone channel in the cord circuit 30.

When the call is answered at the telephone station T1, a circuit, including the winding of the series relay R160, is completed for supplying battery current from the central office to the telephone instrument at the telephone station T1; and a three-way telephone connection is completed involving the subscriber or operator at the central office, the operator position illustrated at the switchboard and the telephone station T1. Specifically, the top and the ring of the rear plug P32 are connected via the contacts 101, 106 and 121, 124, the winding of the series relay R160 and the contacts 171, 174 to the tip and the ring of the front plug P31; whereby the winding of the series relay R160 is energized causing the latter relay to operate. Upon operating the series relay R160 interrupts, at the contacts 161, the circuit for illuminating the front supervisory lamp L33 indicating that the call has been answered at the telephone station T1. Also the series relay R 160 completes, at the contacts 162, a circuit, including the grounded sleeve of the line jack J17, the sleeve of the front plug P31, the contacts 152 and 126 and the third contacts of the operated talk key K37, for operating the start relay R65 in the tone circuit 60. The start relay R65 is operated at this time, since the telephone connection between the subscriber or operator in the central office and the telephone station T1 in the P. B. X 10 includes the operator telephone circuit 40 at the switchboard in the P. B. X 10 as the telephone connection mentioned is not private since the operator at the position illustrated at the switchboard may listen and converse therein.

Upon operating the start relay R65 completes, at the contacts 66, a circuit, including the contacts 71, for energizing the upper winding of the tone relay R70 in order to cause the latter relay to operate. Upon operating the tone relay R70 interrupts, at the contacts 71, the circuit for energizing the upper winding thereof; whereby the tone relay R70 restores to recomplete, at the contacts 71, the circuit for energizing the upper winding thereof. Accordingly, the tone relay R70 operates buzzer fashion; whereby a tone is induced in the lower winding thereof. Also upon operating the start relay R65 completes, at the contacts 66, a multiple circuit, including the contacts 91, for energizing the winding of the control relay R80 in order to cause the latter relay to operate shortly thereafter, it being of the slow-to-operate type. Upon operating the control relay R80 completes, at the contacts 81, a circuit for energizing the winding of the control relay R85 in order to cause the latter relay to operate shortly thereafter, it being of the slow-to-operate type.

Upon operating the control relay R85 completes, at the contacts 86, a circuit for energizing the winding of the control relay R90 in order to cause the latter relay to operate shortly thereafter, it being of the slow-to-operate type. Upon operating the control relay R90 interrupts, at the contacts 91, the circuit for retaining operated the control relay R80. Upon restoring the control relay R80 effects the restoration of the control relay R85, and the latter relay effects the restoration of the control relay R90. Upon restoring the control relay R90 effects the reoperation of the control relay R80. Accordingly, the control relays R80, R85, and R90 operate repeatedly through the cycle described. The lower winding of the tone relay R70 is initially energized via a circuit, including the contacts 82 and 92, the condenser 93, the tertiary winding 46 of the repeating coil 45 and the resistor 51; whereby the tone voltage induced in the lower winding of the tone relay R70 causes a corresponding tone to be induced by the tertiary winding 46 of the repeating coil 45 into the primary winding sections 48 and 49. Upon operating the control relay R80 interrupts, at the contacts 82, the initial circuit traced above; and upon operating the control relay R85 recompletes, at the contacs 87, a point in multiple to the contacts 82 of the operated control relay R85, in the tone circuit mentioned. Upon operating the control relay R90 again interrupts, at the contacts 92, the tone circuit mentioned; and when the control relays R80 and R90 again restore the initial tone circuit is again recompleted at the contacts 82 and 92. Accordingly, the control relays R80, R85 and R90 are effective to cause the tone voltage generated in the lower winding of the tone relay R70 to be applied intermittently to the tertiary winding 46 of the repeating coil 45; whereby a distinct intrusion tone is produced in the repeating coil 45 and applied to the telephone channel of the cord circuit 30; which intrusion tone is not only audible to the operator at the position illustrated at the switchboard in the P. B. X 10, but is also audible to the person at the telephone station T1 in the P. B. X 10 and to the person or operator in the central office, thereby indicating to the operator at the position illustrated at the switchboard in the P. B. X 10 that she should restore the talk key K37 and indicating to the person at the telephone station T1 in the P. B. X 10 and the person or operator in the central office that the established telephone connection is not private at this time.

Normally, the operator at the position illustrated at the switchboard in the P. B. X 10 restores the talk key K37 interrupting, at the first the established telephone connection private between the repeating coil 45 and the telephone channel in the cord circuit 30 in order to render the established telephone connection private between the person at the telephone station T1 in the P. B. X 10 and the person or operator in the central office. Also when the talk key K37 is restored, there is interrupted, at the third contacts thereof, the circuit for retaining operated the start relay R65; whereby the tone relay R70 and the control relays R80, R85 and R90 restore interrupting the application of tone potential to the tertiary winding 46 of the repeating coil 45.

At the conclusion of the established connection, when the person at the station T1 in the P. B. X 10 disconnects the circuit for energizing the winding of the series relay R160 is interrupted causing the latter relay to restore. Likewise, when the person or operator in the central office disconnects, the circuit for energizing the winding of the series relay R160 is interrupted in order to cause the latter relay to restore. Upon restoring the series relay R160 again completes, at the contacts 161, the circuit for illuminating the front supervisory lamp L33 indicating to the operator at the position illustrated at the switchboard in the P. B. X 10 that the connection involving the cord circuit 30 may be taken down. The operator at the position illustrated then withdraws the front plug P31 from the line jack J17 and the rear plug P32 from the trunk jack J13. When the front plug P31 is thus withdrawn the circuit for illuminating the front supervisory lamp L33 is interrupted and when the rear plug P32 is thus withdrawn the circuit for energizing in series the lower winding of the control relay R150 and the lower winding of the sleeve relay R140 is interrupted, causing the relays mentioned to restore. At this time the established connection involving the trunk 11 extending to the central office and the line 15 extending to the telephone station T1 is released and the cord circuit 30 is idle and available for further use.

During the established connection via the cord circuit 30 between the trunk 11 extending to the central office and the line 15 extending to the telephone station T1, should the operator at the switchboard reoperate the talk key K37 in order again to complete a connection between the operator telephone circuit 40 and the telephone channel in the cord circuit 30, the previously traced circuit for operating the start relay R65 in the tone circuit 60 is recompleted at the third contacts of the talk key K37; whereby the intrusion tone is again impressed upon the telephone channel in the cord circuit 30 for the purpose previously explained.

Now assuming that a call is initiated at the telephone station T1 in the P. B. X 10, the line circuit 16 is governed to illuminate the line lamp L18 in order to indicate the presence of the line call waiting to be answered. Now assuming that the operator at the position illustrated at the switchboard in the P. B. X 10 is idle and is to answer the call utilizing the idle cord circuit 30, the operator inserts the front plug P31 into the link jack J17 extending to the line circuit 16, and the talk key K37 is operated. When the front plug P31 is inserted into the line jack J17, the line circuit 16 is governed in order to exinguish the line lamp 18 indicating that the call on the line 15 has been answered at this time. Also, a circuit, including the sleeve of the line jack J17, the sleeve of the front plug P31 and the contacts 146, is completed for operating the sleeve relay R120. Further, current is supplied to the telephone station T1 via the upper and lower windings of the battery supply relay R130 and the winding of the series relay R160. Specifically, ground potential is connected via the contacts 141 and upper winding of the battery supply relay R130 and the contacts 171 to the tip of the front plug P31; and battery potential is supplied via the resistor 154, the contacts 144, the lower winding of the battery supply relay R130, the winding of the series relay R160 and the contacts 174 to the ring of the front plug P31; and the connection is extended from the front plug P31 via the line jack J17, the line circuit 16 and the line 15 to the telephone station T1. Accordingly, the winding of the series relay R160 and the upper and lower windings of the battery supply relay R130 are energized, causing these relays to operate. Further, ground potential supplied to the sleeve of the front plug P31 completes a circuit, including the contacts 148 and 111, for illuminating the rear supervisory lamp L34, indicating that the call has not been extended at this time. Accordingly, at this time a telephone connection is completed between the telephone station T1 and the operator telephone circuit 40 so that the operator at the position illustrated at the switchboard in the B. P. X 10 may converse with the person at the calling telephone station T1 and learn the required extension of the call.

Now assuming that the call initiated at the calling telephone station T1 and answered at the position illustrated at the switchboard in the P. B. X 10 is to be extended to another telephone station in the P. B. X 10, such, for example, as the called telephone station T2, the operator inserts the rear plug P32 into the line jack J22, assuming that the telephone station T2 is idle at this time, as indicated by the extinguished line lamp L23. At this time the operated sleeve relay R120 interrupts, at the contacts 121 and 124, the previously traced direct connection between the upper and lower windings of the battery supply relay R130 and the tip and the ring of the rear plug P32; and completes, at the contacts 122 and 123, a path for bridging the upper and lower windings of the battery supply relay R110 via the contacts 101 and 106 to the tip and the ring of the rear plug P32. The operator then operates the ring trunk and station key K36, completing, at the second contacts thereof, a circuit for operating the ring relay R100. Upon operating the ring relay R100 interrupts, at the contacts 101 and 106, the connection between the tip and the ring of the rear plug P32 and the telephone channel in the cord circuit 30; and completes, at the contacts 102 and 105, a path, including the first and third contacts of the ring trunk and station key K36, for connecting ground potential and the ring conductor C165 respectively to the tip and the ring of the rear plug P32 and, consequently, to the tip and the ring of the line jack J22; whereby ringing current is projected over the line 20 to the telephone station T2, operating the ringer thereat. The operator then restores the ring trunk and station key K36 in order to interrupt, at the second contacts thereof, the circuit for energizing the winding of the ring relay R100, causing the latter relay to restore shortly thereafter, it being of the slow-to-release type. Upon restoring the ring relay R100 interrupts, at the contacts 102 and 105, the path for projecting ringing current over the line 20; and recompletes, at the contacts 101 and 106, the connection between the tip and the ring of the rear plug P32 and the telephone channel in the cord circuit 30.

When the call is answered at the telephone station T2, a circuit substantially identical to that previously traced is completed for supplying battery current via the upper and lower windings of the battery supply relay R110 to the telephone instrument at the telephone station T2; and a three-way telephone connection is completed involving the person at the calling telephone station T1, the person at the called telephone station T2, and the operator position illustrated. At this time battery current is supplied to the calling telephone station T1 via the upper and lower windings of the battery supply relay R130; and battery current is supplied to the called telephone station T2 via the upper and lower windings of the battery supply relay R110. Also, the two sections of the telephone channel in the cord circuit 30 respectively extending to the front plug P31 and to the rear plug P32 are coupled by the two condensers 128 and 129 for communication therebetween.

Moreover, when the call is answered at the telephone station T2, the battery supply relay R110 operates, interrupting at the contacts 111, the circuit for illuminating the rear supervisory lamp L34, indicating that the call has been answered at the telephone station T2. Also, the battery supply relay R110 completes, at the contacts 112, a circuit, including the contacts 125, 153 and the third contacts of the talk key K37, for operating the start relay R65 in the tone circuit 60; whereby the intrusion tone is impressed upon the telephone channel in the cord circuit 30 for the purpose previously explained. The operator at the position illustrated at the switchboard in the P. B. X 10 then restores the talk key 37, interrupting, at the first and second contacts thereof, the connection between the operator telephone circuit 40 and the telephone channel in the cord circuit 30; and interrupting, at the third contacts of the talk key K37, the circuit for retaining operated the start relay R65. At this time an established connection is completed between the calling telephone station T1 and the called telephone station T2, excluding the operator telephone circuit 40 at the operator position illustrated at the switchboard in the P. B. X 10.

At the conclusion of the established connection when the person at the station T1 disconnects, the circuit for energizing the winding of the series relay R160 in series with the upper and lower windings of the battery supply relay R130 is interrupted in order to cause the relays mentioned to restore. Likewise, when the person at the telephone station T2 disconnects, the circuit for energizing in series the upper and lower windings of the battery supply relay R110 is interrupted in order to cause the latter relay to restore. Upon restoring, the series relay R160 again completes, at the contacts 161, the circuit for illuminating the front supervisory lamp L33, indicating disconnection by the person at the telephone station T1; and upon restoring the battery supply relay R110 again completes, at the contacts 111, the circuit for illuminating the rear supervisory lamp L34, indicating disconnection by the person at the telephone station T2. The operator then takes the connection down by withdrawing the front plug P31 from the line jack J17 and by withdrawing the rear plug P32 from the line jack J22. When the front plug P31 is thus withdrawn from the line jack J17, the multiple circuits for illuminating the front supervisory lamp L33 and the rear supervisory lamp L34 are interrupted. At this time the established connection involving the calling telephone station T1 and the called telephone station T2 is released and the cord circuit 30 is idle and available for further use.

During the established connection via the cord circuit 30 between the line 15 extending to the telephone station T1 and the line 20 extending to the telephone station T2, should the operator at the switchboard reoperate the talk key K37 in order again to complete a connection between the operator telephone circuit 40 and the telephone channel in the cord circuit 30, the previously traced circuit for operating the start relay R65 in the tone circuit 60 is recompleted at the third contacts of the talk key K37; whereby the intrusion tone is again impressed upon the telephone channel in the cord circuit 30 for the purpose previously explained.

Now assuming that the call initiated at the calling telephone station T1 and answered at the position illustrated at the switchboard in the P. B. X 10 is to be extended to the central office, the operator first selects an idle trunk, such, for example, as the trunk 11, and inserts the rear plug P32 into the trunk jack J13, the trunk lamp L14 being extinguished at this time, indicating the idle condition of the trunk 11. When the rear plug P32 is thus inserted into the trunk jack J13, the trunk circuit 12 is governed to illuminate the trunk lamp L14 in order to indicate the busy condition of the trunk 11 at this time. Also, a series circuit is completed for energizing the upper and lower windings of the control relay R150 and the lower winding of the sleeve relay R140; this circuit extending from ground potential by way of the lower winding of the sleeve R140, the upper and lower windings of the control relay R150, the contacts 104, the sleeve of the rear plug P32, and the sleeve of the trunk jack J13 to battery potential in the trunk circuit 12. When this series circuit is completed, the control relay R150 operates to complete, at the contacts 151, a path for short-circuiting the upper winding thereof, in order to reduce the resistance in the series circuit for energizing the lower winding of the control relay R150 and the lower winding of the sleeve relay R140; whereupon the control relay R150 is retained in its operated position and the sleeve relay R140 operates. Upon operating, the sleeve relay R140 interrupts, at the contacts 141 and 144, the previously traced circuit for supplying battery current via the upper and lower windings of the battery supply relay R130 and the front plug P31 to the calling telephone station T1; whereby the battery supply relay R130 and the series relay R160 restore. Upon restoring, the series relay R160 completes, at the contacts 161, the previously traced circuit for illuminating the front supervisory lamp L33. Also, upon operating, the sleeve relay R140 prepares, at the contacts 142 and 143, a path, including the condenser 149 and the contacts 121, 124, 101 and 106, for bridging the upper winding of the sleeve relay R140 via the upper and lower windings of the battery supply relay R130, across the tip and the ring of the rear plug P32. Further, upon operating the sleeve relay R140 interrupts, at the contacts 146, the circuit for retaining operated the sleeve relay R120; and interrupts, at the contacts 148, the previously traced circuit for illuminating the rear supervisory lamp L34. Upon restoring, the sleeve relay R120 completes, at the contacts 121 and 124, the previously traced path for bridging the upper winding of the sleeve relay R140 via the upper and lower windings of the battery supply relay R130, across the tip and the ring of the rear plug P32.

The illuminated front supervisory lamp L33 indicates that the present call extended to the central office via the cord circuit 30 has not been answered at this time.

The operator then operates the ring trunk and station key K36, completing, at the second contacts thereof, the circuit for operating the ring relay R100. Upon operating, the ring relay R100 completes, at the contacts 103, a local holding circuit, including the resistor 154 and the contacts 145, for energizing the lower winding of the control relay R150 in series with the lower winding of the sleeve relay R140; and interrupts, at the contacts 104, previously traced original circuit for energizing the lower winding of the control relay R150 in series with the lower winding of the sleeve relay R140. Also, the ring relay R100 interrupts, at the contacts 101 and 106, the connection between the tip and the ring of the rear plug P32 and the telephone channel in the cord circuit 30; and completes, at the contacts 102 and 105, a path, including the first and third contacts of the ring trunk and station key K36, for connecting ground potential and the ring conductor C165, respectively, to the tip and the ring of the rear plug P32 and, consequently, to the tip and the ring of the trunk jack J13; whereby ringing current is projected over the trunk 11 to the central office. The operator then restores the ring trunk and station key K36 in order to effect the restoration of the ring relay R100 shortly thereafter, the latter relay being of the slow-to-release type. Upon restoring the ring relay R100 interrupts the path for projecting ringing current over the trunk 11 and recompletes the connection between the tip and the ring of the rear plug P32 and the telephone channel in the cord circuit 30.

When the call is answered in the central office, battery current therein is supplied via the line conductors of the trunk 11, the trunk circuit 12, the tip and the ring of the trunk jack J13, the tip and the ring of the rear plug P32, the contacts 101, 106, 121, 124, the winding of the series relay R160, the contacts 171, 174, the tip and the ring of the front plug P31, the tip and the ring of the line jack J17, the line circuit 16 and the line conductors of the telephone line 15 to the calling telephone station T1. When this circuit is thus completed, the series relay R160 operates; also a telephone connection is completed between the operator telephone circuit 40 and the channel in the cord circut 30, so that the operator at the position illustrated at the switchboard in the P. B. X 10 may converse with the person at the calling telephone station T1 and with the person or operator in the central office.

Upon operating the series relay R160 interrupts, at the contacts 161, the circuit for illuminating the front supervisory lamp L33, indicating that the call has been answered in the central office. Further, the series relay R160 completes, at the contacts 162, a circuit, including the contacts 152, 126, the third contacts of the talk key K37, the sleeve of the front plug P31 and the sleeve of the line jack J17, for operating the start relay R65 in the tone circuit 60; whereby the intrusion tone is impressed upon the telephone channel in the cord circuit 30, for the purpose previously explained. The operator at the position illustrated at the switchboard in the P. B. X 10 then restores the talk key K37, interrupting, at the first and second contacts thereof, the connection between the operator telephone circuit 40 and the telephone channel in the cord circuit 30; and interrupting, at the third contacts thereof, the circuit for retaining operated the start relay R65. At this time an established connection is completed between the calling telephone station T1 in the P. B. X 10 and the called telephone station or operator switchboard in the central office, excluding the operator telephone circuit 40 at the operator position illustrated at the switchboard in the P. B. X 10.

At the conclusion of the established connection when the person at the telephone station T1 in the P. B. X 10 disconnects, the circuit for retaining operated the series relay R160 is interrupted. Likewise, when the person or operator in the central office disconnects, the circuit for retaining operated the series relay R160 is interrupted. Upon restoring the series relay R160 completes, at the contacts 161, the circuit for illuminating the front supervisory lamp L33, indicating to the operator at the position illustrated at the switchboard in the P. B. X 10 that the connection involving the cord circuit 30 may be taken down. The operator at the position illustrated then withdraws the front plug P31 from the line jack J17 and the rear plug P32 from the trunk jack J13, interrupting the circuit for illuminating the front supervisory lamp L33 and effecting the restoration of the sleeve relay R140 and the control relay R150, in the manner previously explained. At this time the established connection involving the trunk 11 extending to the central office and the line 15 extending to the telephone station T1 is released and the cord circuit 30 is idle and available for further use.

During the established connection via the cord circuit 30 between the trunk 11 extending to the central office and the line 15 extending to the telephone station T1 should the operator at the switchboard reoperate the talk key K37 in order again to complete a connection between the operator telephone circuit 40 and the telephone channel in the cord circuit 30, the previously traced circuit for operating the tone circuit 60 is recompleted; whereby the intrusion tone is again impressed upon the telephone channel in the cord circuit 30 for the purpose previously explained.

Now assume that a connection has been set up involving the trunk 11 extending to the central office and the line 15 extending to the telephone station T1 utilizing a cord circuit, not shown, either at the operator position illustrated or at another operator position, not shown, at the switchboard, and that the operator at the switchboard in the P. B. X 10 endeavors to listen in upon the established connection utilizing the idle cord circuit 30. In order to attempt this objective the operator at the position illustrated may insert the rear plug P32 of the idle cord circuit 30 into a multiple of the trunk jack J13. In this case the battery potential appearing upon the sleeve of the multiple of the trunk jack J13 is of intermediate value due to the previously completed connection via the cord circuit, not shown; whereby the circuit for energizing in series the upper and lower windings of the control relay R150 and the lower winding of the sleeve relay R140 causes operation of the sleeve relay R140 without effecting operation of the control relay R150, since the control relay R150 is of the marginal type. At this time, in the event the talk key K37 is operated there is completed, at the third contacts thereof, a circuit, including the contacts 126 and 153, for operating the start relay R65 in the tone circuit 60; whereby the intrusion tone is impressed upon the telephone channel in the cord circuit 30 and, consequently, upon the established connection including the cord circuit, not shown.

Alternatively, in order to attempt this objective the operator at the position illustrated may insert the front plug P31 of the idle cord circuit 30 into the multiple of the trunk jack J13. In this case the battery potential appearing upon the sleeve of the multiple of the trunk jack J13 is of intermediate value, due to the previously completed connection via the cord circuit, not shown; whereby the winding of the sleeve relay R120 is not sufficiently energized to effect operation thereof, since it is of the marginal type. Accordingly, the above traced circuit for energizing the winding of the start relay R65 in the tone circuit 60 is recompleted, at the third contacts of the talk key K37, incident to operation thereof; whereby the intrusion tone is impressed upon the telephone channel in the cord circuit 30 and, consequently, upon the established connection including the cord circuit, not shown.

As a further variation of this attempt, the operator at the position illustrated may first insert the front plug P31 of the cord circuit 30 into an idle line jack, such, for example, as the line jack J17, and then insert the rear plug P32 into the multiple of the trunk jack J13. In this case when the front plug P31 is inserted into the idle line jack J17 the sleeve relay R120 is operated in order to complete, at the contacts 122 and 123, the previously traced path for bridging the upper and lower windings of the battery supply relay R110 across the tip and the ring of the rear plug P32. When the rear plug P32 is then inserted into the multiple of the trunk jack J13, the upper and lower windings of the battery supply relay R110 are bridge across the line conductors of the trunk 11, whereby battery current is supplied via the upper and lower windings of the battery supply relay R110 in multiple with the central office to the telephone station in the P. B. X involved in the established connection via the cord circuit, not shown; whereby the upper and lower windings of the battery supply relay R110 are energized in series circuit relation, causing the latter relay to operate. Also, when the rear plug P32 is inserted into the multiple of the trunk jack J13, the sleeve relay R140 is operated and the control relay R150 is not operated, as previously explained. Accordingly, at this time a circuit, including the contacts 153, 125, 112 and the third contacts of the talk key K37, is completed incident to operation of the talk key K37 for operating the start relay R65 in the tone circuit 60; whereby the intrusion tone is impressed upon the telephone channel in the cord circuit 30 and, consequently, upon the established connection including the cord circuit, not shown.

In view of the foregoing, it will be understood that it is impossible for the operator at the position illustrated at the switchboard to utilize the idle cord circuit 30 to listen in upon an established connection completed between a telephone station in the P. B. X 10 and the central office via another cord circuit without causing the intrusion tone to be impressed upon the established connection, giving the presons involved therein warning of the unauthorized entry of the operator at the position illustrated at the switchboard in the P. B. X 10.

Now assume that a connection has been set up involving the lines 15 and 20 in the P. B. X 10 utilizing a cord circuit, not shown, either at the operator position illustrated or at another operator position, not shown, at the switchboard and that the operator at the position illustarted at the switchboard in the P. B. X 10 endeavors to listen in upon the established connection utilizing the idle cord circuit 30. In order to attempt this objective the operator at the position illustrated may insert the rear plug P32 of the idle cord circuit 30 into a mutliple of the line jack J22. In this case the potential appearing upon the sleeve of the multiple of the line jack J22 is of intermediate value, effecting operation of the sleeve relay R140 and preventing operation of the control relay R150; whereby the start relay R65 is operated incident to operation of the talk key K37, for the purpose previously explained.

Alternatively, the operator may attempt this objective by inserting the front plug P31 of the idle cord circuit 30 into the multiple of the line jack J22. In this case the potential appearing upon the sleeve of the multiple of the line jack J22 is of intermediate value, preventing operation of the sleeve relay R120; whereby the start relay R65 is operated incident to operation of the talk key K37, for the purpose previously explained.

In view of the foregoing, it will be understood that it is impossible for the operator at the position illustrated at the switchboard to utilize the idle cord circuit 30 to listen in upon an established connection completed between two lines in the P. B. X 10 via another cord circuit without causing the intrusion tone to be impressed upon the established connection, giving the persons involved therein warning of the unauthorized entry of the operator at the position illustrated at the switchboard in the P. B. X 10.

In view of the foregoing, it is apparent that there has been provided in a P. B. X a switchboard including operator positions provided with cord circuits that may be utilized for the purpose of setting up local calls in the P. B. X and trunk calls involving the P. B. X and a central office, which cord circuits are so connected and arranged that it is impossible for the operator at any position at the switchboard to intrude in any established connection without causing a warning tone to be impressed thereon indicating such intrusion.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a central office, a private branch exchange provided with lines and a manual switchboard, and trunks extending between said office and said exchange, said switchboard including a telephone set and a tone source and a cord circuit adapted to set up a telephone connection between two of said lines or between one of said lines and one of said trunks; said cord circuit including a telephone channel, a key, means responsive to operation of said key for connecting said telephone set to said telephone channel, a first relay controlled in response to the completion of a telephone connection via said telephone channel between two of said lines, a second relay controlled in response to the completion of a telephone connection via said telephone channel between one of said lines and one of said trunks, a first circuit governed jointly by operation of said key and control of said first relay for effecting connection of said tone source to said telephone channel, and a second circuit governed jointly by operation of said key and control of said second relay for effecting connection of said tone source to said telephone channel.

2. In a telephone system including a central office, a private branch exchange provided with lines and a manual switchboard, and trunks extending between said office and said exchange, said switchboard including a telephone set and a tone source and a cord circuit adapted to set up a telephone connection between two of said lines or between one of said lines and one of said trunks; said cord circuit including a telephone channel, a key, means responsive to operation of said key for connecting said telephone set to said telephone channel, a first battery supply relay, a second battery supply relay, a sleeve relay, a series relay, means responsive to connection of said telephone channel to a calling one of said lines for supplying current thereto via said first battery supply relay in order to effect operation thereof, means responsive to answering of a call on a called one of said lines to which said telephone channel is connected for supplying current thereto via said second battery supply relay in order to effect operation thereof, means responsive to connection of said telephone channel to a called one of said trunks for operating said sleeve relay, means responsive to operation of said sleeve relay for disconnecting said first battery supply relay from said telephone channel in order to effect restoration thereof, means responsive to answering of a call on said one called trunk for supplying current thereover and via said telephone channel and said series relay to said one calling line in order to effect operation of said series relay, a first circuit governed jointly by operation of said key and by operation of said second battery supply relay for effecting connection of said tone source to said telephone channel, and a second circuit governed jointly by operation of said key and by operation of said series relay for effecting connection of said tone source to said telephone channel.

3. In a telephone system including a central office, a private branch exchange provided with lines and a manual switchboard, and trunks extending between said office and said exchange, said switchboard including a telephone set and a tone source and a plurality of cord circuits each of which is adapted to set up a telephone connection between two of said lines or between one of said lines and one of said trunks; each of said cord circuits including a telephone channel, a key, means responsive to operation of said key for connecting said telephone set to said telephone channel, a sleeve relay normally occupying a restored position, means responsive to connection of said telephone channel to one of said trunks for operating said sleeve relay only in the event said one trunk is idle and responsive to connection of said telephone channel to one of said lines for retaining said sleeve relay in its restored position regardless of the idle or busy condition of said one line, and a circuit governed jointly by operation of said key and by the restored position of said sleeve relay for effecting connection of said tone source to said telephone channel.

4. In a telephone system including a central office, a private branch exchange provided with lines and a manual switchboard, and trunks extending between said office and said exchange, said switchboard including a telephone set and a tone source and a plurality of cord circuits each of which is adapted to set up a telephone connection between two of said lines or between one of said lines and one of said trunks; each of said cord circuits including a telephone channel, a key, means responsive to operation of said key for connecting said telephone set to said telephone channel, a sleeve relay normally occupying a restored position, means responsive to connection of said telephone channel to one of said lines for operating said sleeve relay only in the event said one line is idle and responsive to connection of said telephone channel to one of said trunks for retaining said sleeve relay in its restored position regardless of the idle or busy condition of said one trunk, and a circuit governed jointly by operation of said key and by the restored position of said sleeve relay for effecting connection of said tone source to said telephone channel.

5. In a telephone system including a central office, a private branch exchange provided with lines and a manual switchboard, and trunks extending between said office and said exchange, said switchboard including a telephone set and a tone source and a plurality of cord circuits each of which is adapted to set up a telephone connection between two of said lines or between one of said lines and one of said trunks; each of said cord circuits including a telephone channel, a key, means responsive to operation of said key for connecting said telephone set to said telephone channel, a first sleeve relay normally occupying a restored position, means responsive to connection of said telephone channel to one of said trunks for operating said first sleeve relay only in the event said one trunk is idle and responsive to connection of said telephone channel to one of said lines for retaining said first sleeve relay in its restored position regardless of the idle or busy condition of said one line, a second sleeve relay normally occupying a restored position, means responsive to connection of said telephone channel to one of said lines for operating said second sleeve relay only in the event said one line is idle and responsive to connection of said telephone channel to one of said trunks for retaining said second sleeve relay in its restored position regardless of the idle or busy condition of said one trunk, and a circuit governed jointly by operation of said key and by the restored positions of both said first and second sleeve relays for effecting connections of said tone source to said telephone channel.

KARL L. BURGENER.

REFERENCES CITED

The following references are of record in the file of this patent:

UNITED STATES PATENTS

| Number | Name | Date |
|---|---|---|
| 1,097,760 | Koltonski | May 26, 1914 |
| 1,207,823 | Webster | Dec. 12, 1916 |
| 1,617,611 | Wallace | Feb. 15, 1927 |
| 1,783,310 | Saunders | Dec. 2, 1930 |
| 1,931,603 | Darrow | Oct. 24, 1933 |
| 2,057,864 | Voss | Oct. 20, 1936 |
| 2,087,930 | Voss | July 27, 1937 |
| 2,252,857 | McAndrew | Aug. 19, 1941 |
| 2,333,140 | Allen | Nov. 2, 1943 |
| 2,335,481 | Boswau | Nov. 30, 1943 |